(12) United States Patent
Moyer

(10) Patent No.: US 8,646,739 B2
(45) Date of Patent: Feb. 11, 2014

(54) MOUNT FOR PERSONAL ELECTRONIC DEVICE

(75) Inventor: Christopher James Moyer, East Stroudsburg, PA (US)

(73) Assignee: Organization Solutions, LLC, East Stroudsburg, PA (US)

( * ) Notice: Subject to any disclaimer, the term of this patent is extended or adjusted under 35 U.S.C. 154(b) by 166 days.

(21) Appl. No.: 13/316,380

(22) Filed: Dec. 9, 2011

(65) Prior Publication Data

US 2012/0187260 A1 Jul. 26, 2012

Related U.S. Application Data

(60) Provisional application No. 61/436,317, filed on Jan. 26, 2011.

(51) Int. Cl.
*F16M 11/00* (2006.01)
(52) U.S. Cl.
USPC ........ 248/201; 248/448; 248/205.3; 220/4.21
(58) Field of Classification Search
USPC .............. 248/683, 447.1, 448, 453, 467, 201, 248/205.3, 298.1, 316.8; 220/4.21, 480; 224/442
See application file for complete search history.

(56) References Cited

U.S. PATENT DOCUMENTS

| | | | | |
|---|---|---|---|---|
| 4,951,906 | A | * | 8/1990 | Morey ........................... 248/201 |
| 5,056,677 | A | | 10/1991 | Toyosawa |
| 5,259,028 | A | * | 11/1993 | Westbrook .................... 379/455 |
| 5,732,914 | A | * | 3/1998 | Flinn ............................. 248/201 |
| 5,836,563 | A | | 11/1998 | Hsin-Yung |
| 5,928,747 | A | * | 7/1999 | Luhmann et al. ............ 428/40.1 |
| 5,947,437 | A | * | 9/1999 | Tate et al. ..................... 248/467 |
| D425,908 | S | | 5/2000 | Collins |
| 6,370,741 | B1 | | 4/2002 | Lu |
| 6,454,106 | B1 | * | 9/2002 | Howard .......................... 211/50 |
| 6,572,063 | B1 | * | 6/2003 | Gitelman et al. ............. 248/314 |
| 6,959,899 | B2 | | 11/2005 | Yeh |
| 7,614,595 | B2 | | 11/2009 | Richter |
| 7,757,913 | B2 | | 7/2010 | Fichera |

(Continued)

FOREIGN PATENT DOCUMENTS

GB 2459745 11/2009
WO WO03075546 A1 9/2003

OTHER PUBLICATIONS

International Search Report and Written Opinion for PCT/US2012/067912, mailed Mar. 1, 2013.

*Primary Examiner* — Bradley Duckworth
(74) *Attorney, Agent, or Firm* — Joseph E. Maenner; Maenner & Associates, LLC

(57) ABSTRACT

A mount assembly for a personal electronic device includes first and second separate mounts, each mount having a generally planar back face having a rear, wall mount surface and a forward surface. A planar front face extends parallel to the back face. A side face extends between the back face and the front face. A bottom face extends between the back face and the front face. The bottom face has an upper surface and an under surface. The back face, the front face, the side face, and the bottom face of each of the first and second mounts form a receiver having an opening disposed away from each side face, such that, when the first mount and the second mount are mounted on a wall, the opening in the first mount receiver is proximate the opening in the second mount receiver.

19 Claims, 10 Drawing Sheets

(56) References Cited

U.S. PATENT DOCUMENTS

| | | |
|---|---|---|
| 2004/0235533 A1 | 11/2004 | Bae |
| 2007/0090241 A1 | 4/2007 | Risse |
| 2007/0164178 A1 | 7/2007 | Beilstein et al. |
| 2007/0207842 A1 | 9/2007 | Pemble et al. |
| 2007/0262223 A1 | 11/2007 | Wang et al. |
| 2008/0078793 A1 | 4/2008 | Brown |
| 2009/0174998 A1 | 7/2009 | Struthers et al. |
| 2009/0218454 A1 | 9/2009 | Stanley |
| 2009/0256040 A1 | 10/2009 | Lee et al. |
| 2009/0314908 A1* | 12/2009 | Kassouni ............... 248/205.4 |
| 2010/0072334 A1 | 3/2010 | Le Gette et al. |
| 2012/0168471 A1* | 7/2012 | Wilson ........................ 224/152 |

* cited by examiner

MOUNT FOR PERSONAL ELECTRONIC DEVICE

CROSS-REFERENCE TO RELATED APPLICATION

The present invention claims priority from U.S. Provisional Patent Application Ser. No. 61/436,317, filed on Jan. 26, 2011, which is incorporated herein by reference in its entirety.

FIELD OF THE INVENTION

The present invention relates to a wall mountable device that is used to support a personal electronic device.

BACKGROUND OF THE INVENTION

Personal electronic devices are used in everyday life to entertain and to inform us. These electronic devices, however, tend to be relatively fragile and often break or are otherwise damaged if dropped. Therefore, it would be beneficial to provide a mounting system that allows a user to mount his/her personal electronic device onto a wall so that the electronic device does not get dropped or knocked off a table, yet still allow the electronic device to be viewed, easily accessible to the user, and easily removable from its mounting system. It would also be beneficial if the mounting system is easily adjustable on and/or removable from a wall, without making holes in or otherwise marking up the wall.

BRIEF SUMMARY OF THE INVENTION

Briefly, the present invention provides a mount assembly for a personal electronic device. The assembly includes first and second separate mounts, each mount having a generally planar back face having a rear, wall mount surface and a forward surface. A planar front face extends parallel to the back face. A side face extends between the back face and the front face. A bottom face extends between the back face and the front face. The bottom face has an upper surface and an under surface. The back face, the front face, the side face, and the bottom face of each of the first and second mounts form a receiver having an opening disposed away from each side face, such that, when the first mount and the second mount are mounted on a wall, the opening in the first mount receiver is proximate the opening in the second mount receiver.

Additionally, the present invention provides a mount assembly for a portable electronic device comprising a first mount and a second mount, separate from the first mount. Each of the first and second mount has a rear portion; a forward portion; a bottom portion connecting the rear portion to the forward portion; and a side portion connecting the rear portion, the bottom portion, and the forward portion to each other, wherein the side portion extends in a plane. A releasable adhesive pull tab securing slot extends from the rear portion. A first cord clip extends downwardly from the rear portion of the first mount and has a first size. A second cord clip extends downwardly from the rear portion and has a second size, different from the first size.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
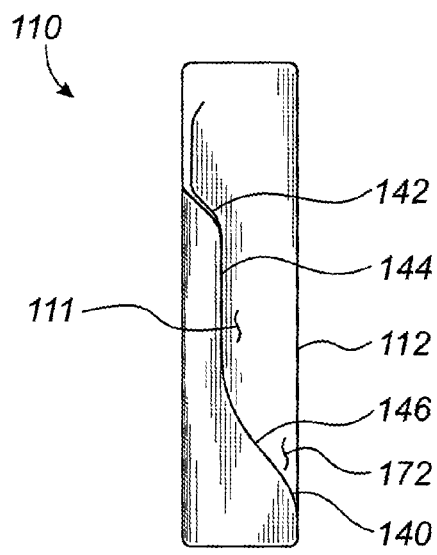
FIG. 1 is a front elevation view of a left mounting bracket according to a first exemplary embodiment of the present invention.

In the drawings, like numerals indicate like elements throughout. The numerals, however, do not form part of the inventive device. Certain terminology is used herein for convenience only and is not to be taken as a limitation on the present invention. The terms "back" and "rear" refer to locations closer to a wall when the inventive device is mounted on the wall and the terms "front" and "forward" refer to locations farther from the wall when the inventive device is mounted on the wall. The terms "bottom" and "lower" refer to locations closer to a floor when the inventive device is mounted on the wall and the terms "top" and "upper" refer to locations farther from the floor when the inventive device is mounted on the wall. The term "outward" refers to a direction away from a wall when the inventive device is mounted on the wall, the term "upward" refers to a direction away from the floor when the inventive device is mounted on the wall, and the term "downward" refers to a direction toward the floor when the inventive device is mounted on the wall. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

A mount assembly according to the present invention may be removably mounted on a wall and used to support and display a personal electronic device. Exemplary personal electronic devices may be used with the present invention include, but are not limited to, iPads, iPods, iPhones, iTouches, Androids, Motorola Xooms, Samsung Galaxy Tabs, BlackBerry Playbooks, and other generally flatscreen portable and/or personal electronic devices.

The inventive mount assembly utilizes removable adhesive strips such as, for example 3M Command® strips, in order to easily mount the inventive mount assemblies on a wall and to remove the inventive mount assemblies without marking or otherwise damaging the wall. The inventive mount assembly uses gravity to support the electronic device but those skilled in the art will recognize that the inventive mount assembly can also be sized to provide a slight gripping feature to stabilize the electronic device.

Figure 15:
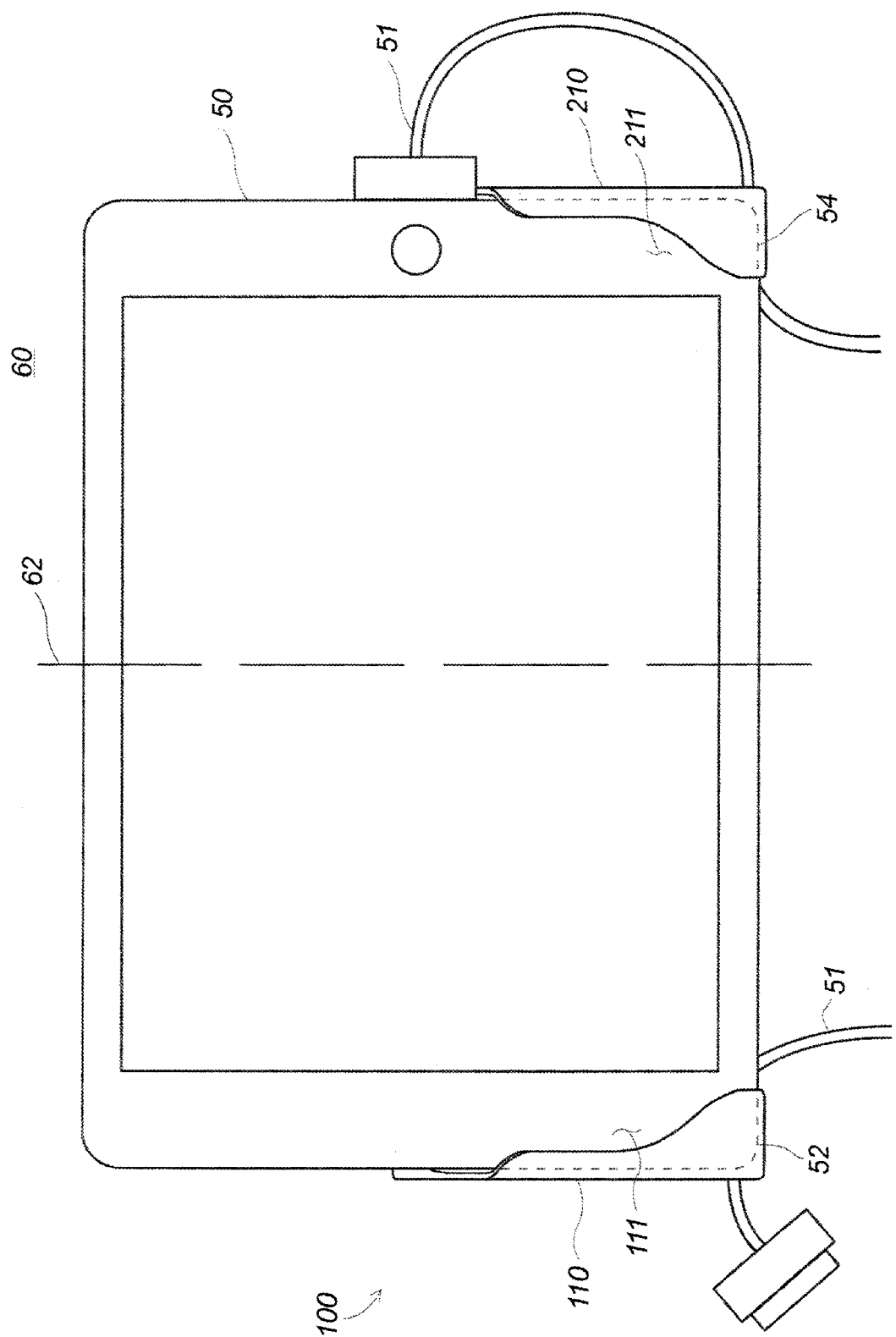
FIG. 15 is a front elevation view of the left mounting bracket of FIGS. 1-7 and the right mounting bracket of FIGS. 8-14 supporting a personal electronic device on wall in a landscape position.

Referring to all FIGS. 1-15, a mount assembly 100 according to a first exemplary embodiment of the present invention is shown. Referring specifically to FIG. 15, mount assembly 100 includes a first mount 110 that is used to support a first lower corner 52 of an electronic device 50 within a receiver 111 and a second mount 210 that is used to support a second lower corner 54 of electronic device 50 within a receiver 211 when mount assembly 100 is mounted on a wall 60.

In many aspects, first mount 110 and second mount 210 are mirror images of each other across a plane 62 perpendicular to wall 60 when mount assembly 100 is mounted on wall 60. For ease of description therefore, elements of first mount 110 that are mirror images of elements of second mount 210 will be identified with a three digit number beginning with "1", while the elements of second mount 210 will be identified with a three digit number beginning with "2", with the last two digits of each corresponding element being identical. For example, element 112 in first mount 110 is a mirror image of element 212 in second mount 210.

Referring to FIGS. 1-7, first mount 110 includes a generally planar, elongate back face 112 having a rear, wall mount surface 114 and a forward surface 116. Back face 112 is sized to allow a removable adhesive strip 70 such as, for example, a 3M Command® strip to be removably attached to wall mount surface 114 such that removable adhesive strip 70 is not visible when mount assembly 100 is mounted on wall 60 and electronic device 50 is mounted in mount assembly 100.

Figure 2:
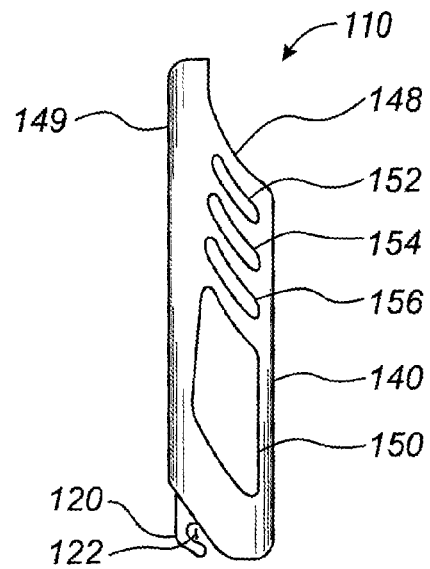
FIG. 2 is a left side elevation view of the mounting bracket of FIG. 1.
Figure 3:
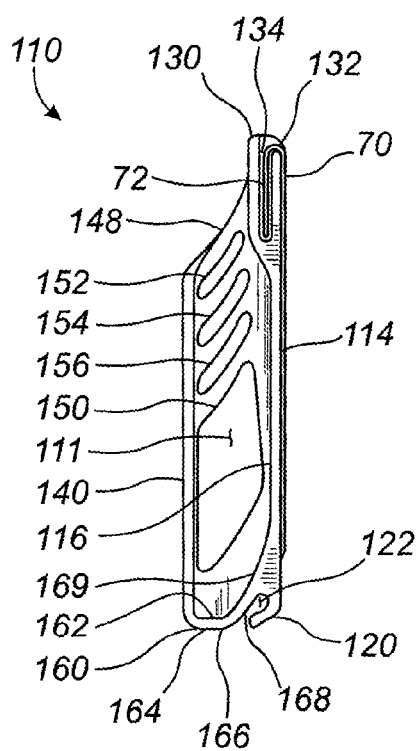
FIG. 3 is a right side elevation view of the mounting bracket of FIG. 1.
Figure 15A:
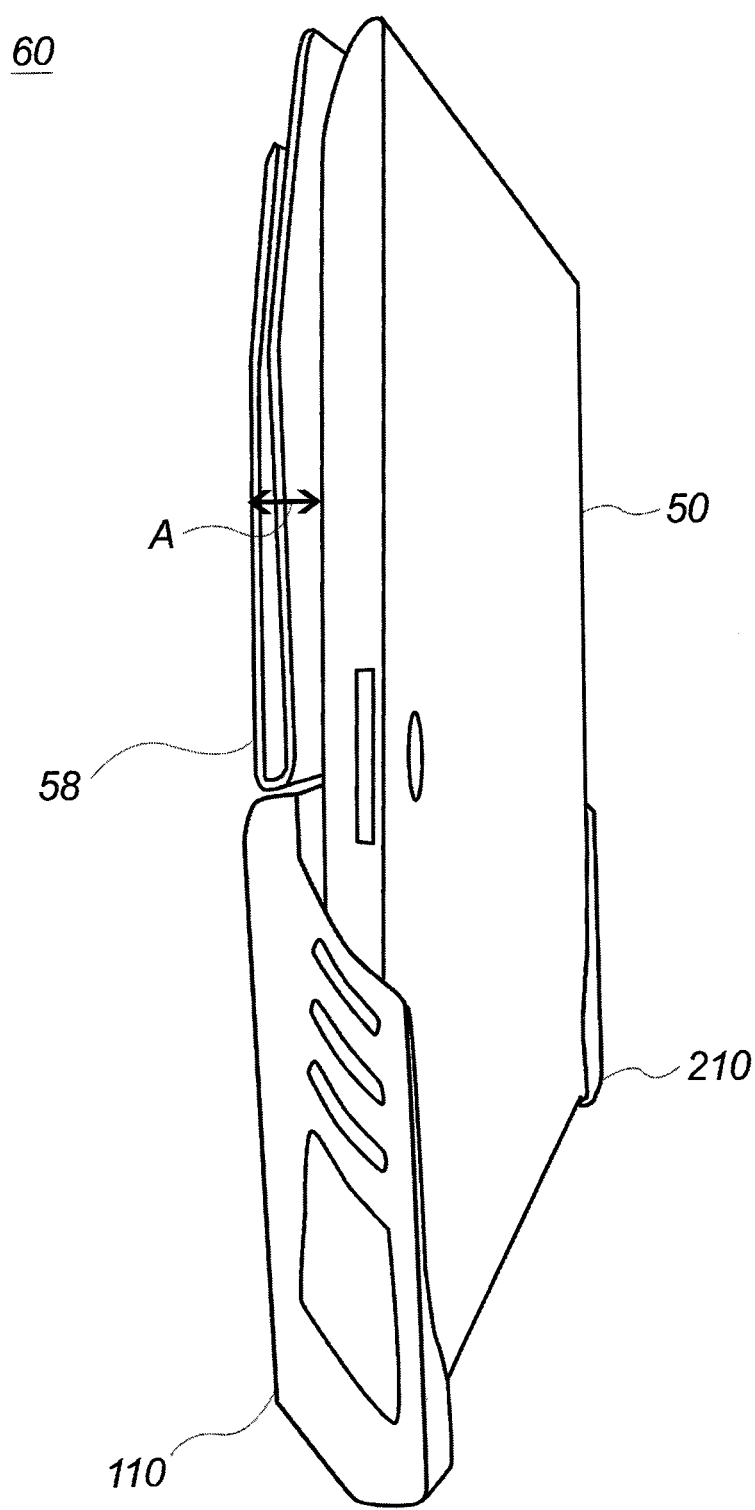
FIG. 15A is a left side elevation view of the mounting bracket and personal electronic device of FIG. 15.
Figure 15B:
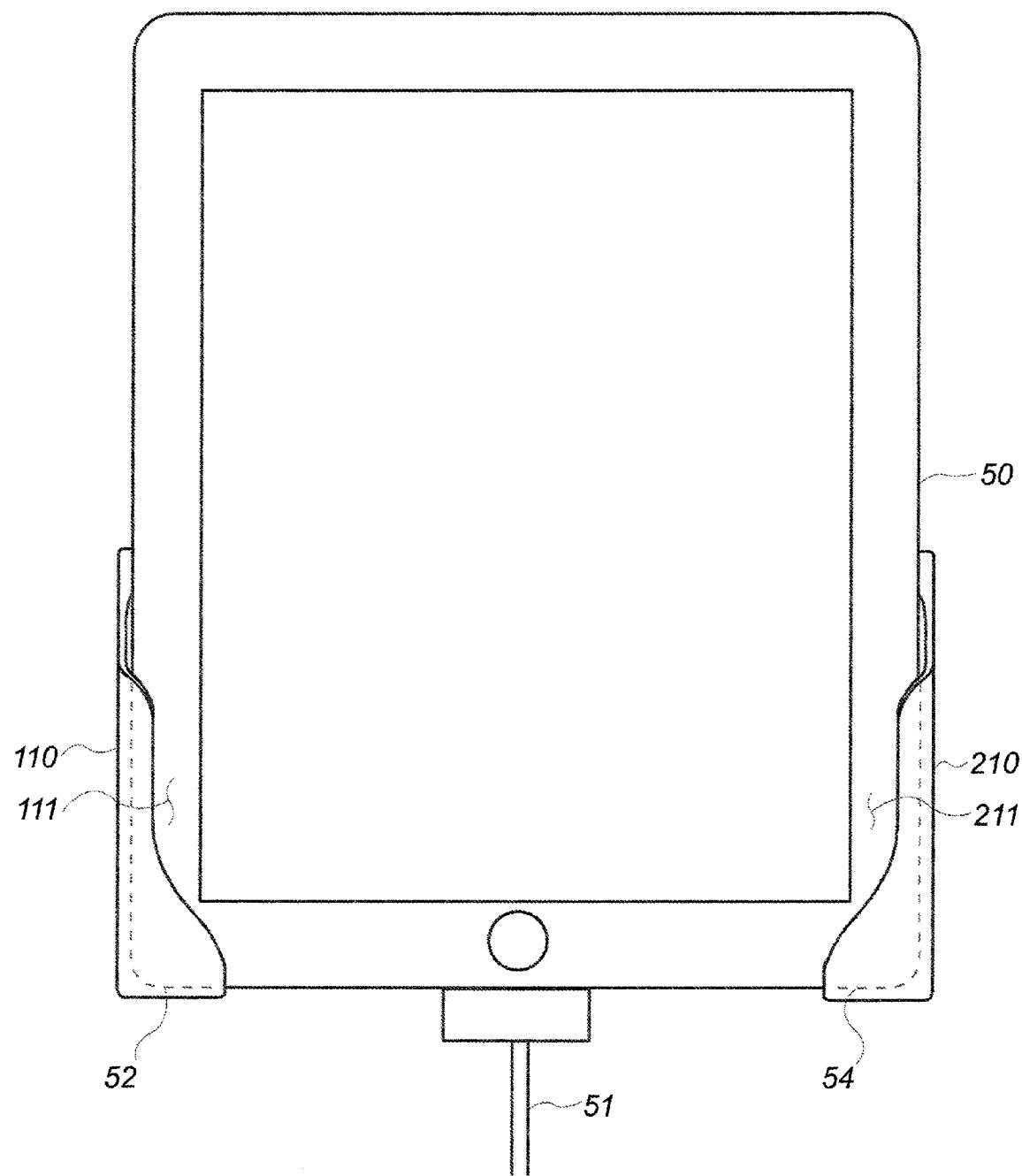
FIG. 15B is a front elevation view of the left mounting bracket of FIGS. 1-7 and the right mounting bracket of FIGS. 8-14 supporting a personal electronic device on wall in a portrait position.
Figure 16:
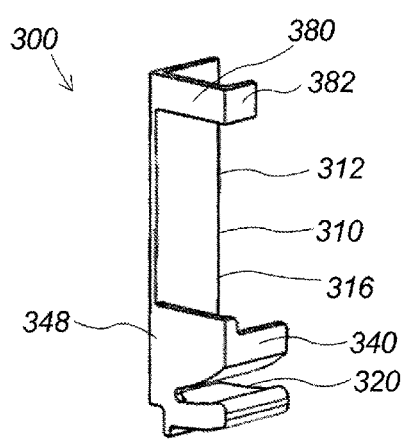
FIG. 16 is a left front perspective view of a left mounting bracket according to a second exemplary embodiment of the present invention.
Figure 17:
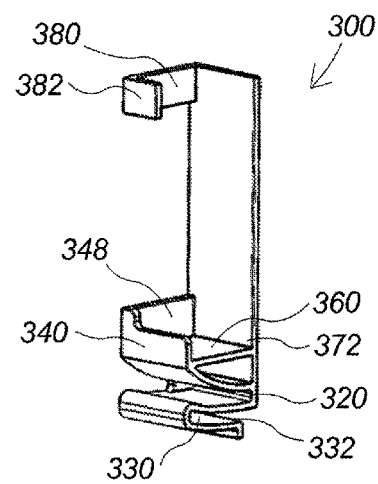
FIG. 17 is a right front perspective view of the mounting bracket of FIG. 16.
Figure 18:
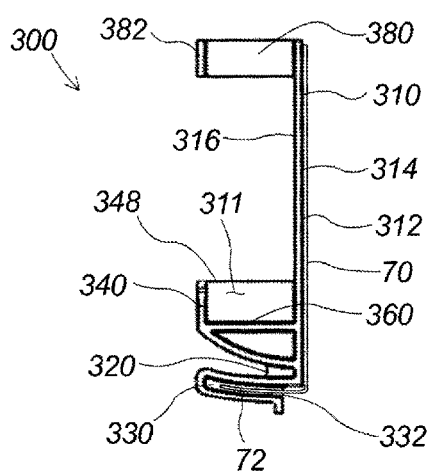
FIG. 18 is a right side elevation view of the mounting bracket of FIG. 16.
Figure 19:
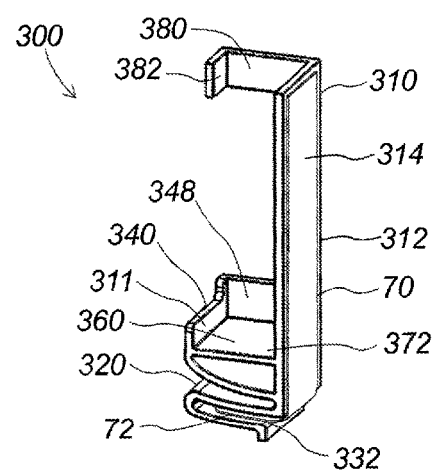
FIG. 19 is a right rear perspective view of the mounting bracket FIG. 16.
Figure 20:
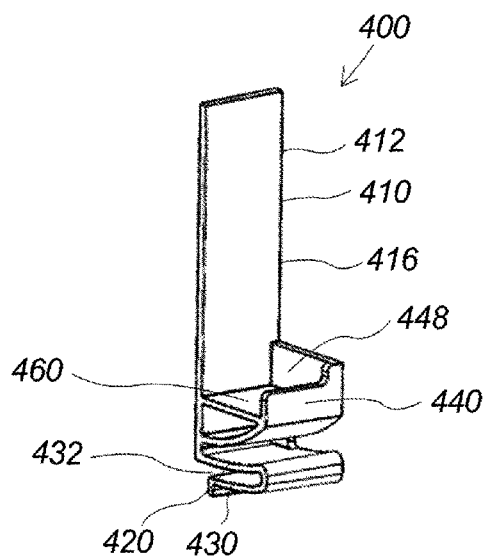
FIG. 20 is a left front perspective view of a right mounting bracket according to the second exemplary embodiment of the present invention.
Figure 21:
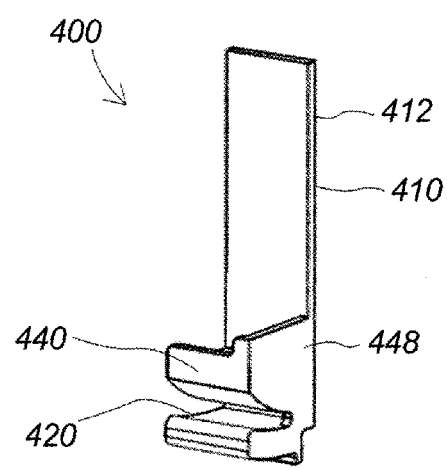
FIG. 21 is a right front perspective view of the mounting bracket of FIG. 20.
Figure 22:
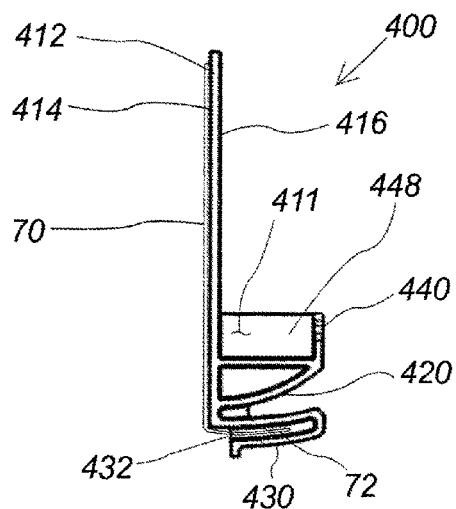
FIG. 22 is a right side elevation view of the mounting bracket of FIG. 20.
Figure 23:
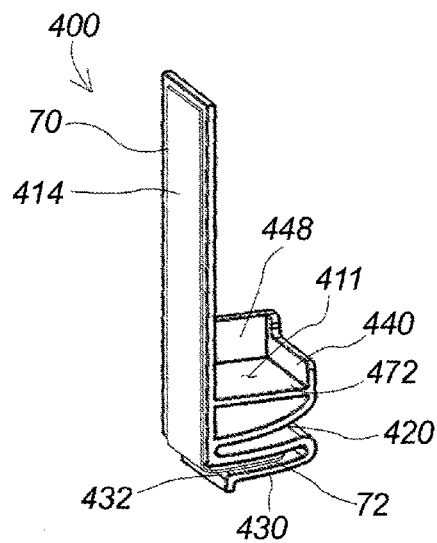
FIG. 23 is a right rear perspective view of the mounting bracket FIG. 20.

Referring specifically to FIGS. 2 and 3, a first cord retainer clip 120 extends from back face 112. First cord retainer clip 120 is shaped generally like an arcuate finger that extends generally the width of back face 112 and includes a first opening 122 that is sized to allow a power cord 51 (shown in FIG. 15) for providing AC power to electronic device 50 to be received within opening 122 and retained by first cord retainer clip 120. As shown in FIGS. 15 and 15B, electronic device 50 can be mounted in a portrait view or a landscape view, depending on how the user wants to mount electronic device 50 on wall 60.

Figure 9:
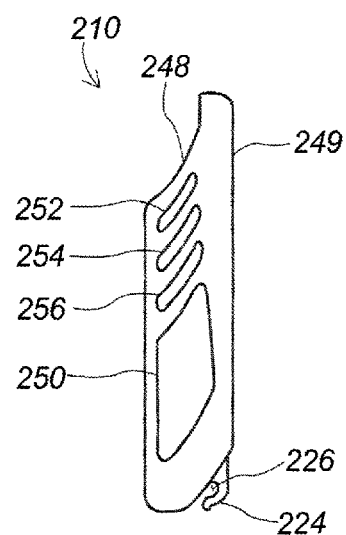
FIG. 9 is a left side elevation view of the mounting bracket of FIG. 8.
Figure 10:
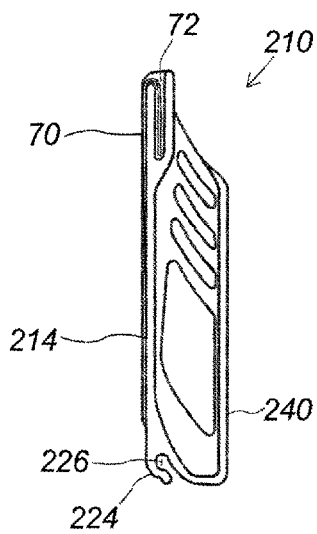
FIG. 10 is a right side elevation view of the mounting bracket of FIG. 8.
Figure 11:
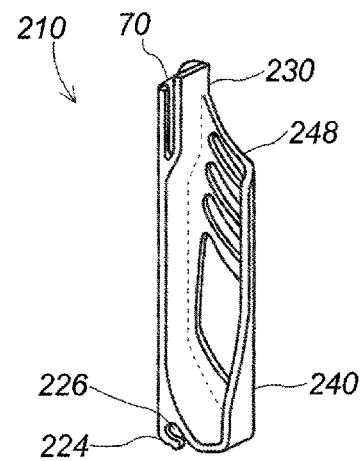
FIG. 11 is a perspective view of the mounting bracket of FIG. 8.
Figure 12:
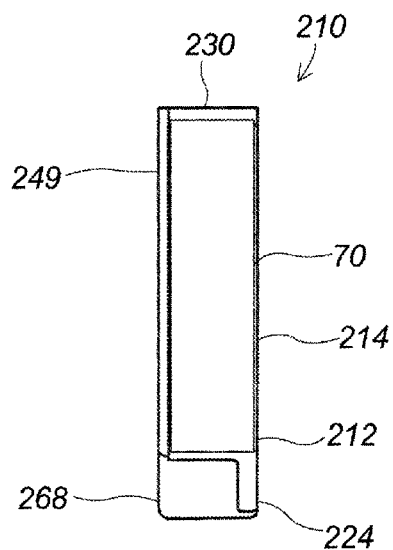
FIG. 12 is a rear elevation view of the mounting bracket FIG. 8.
Figure 13:
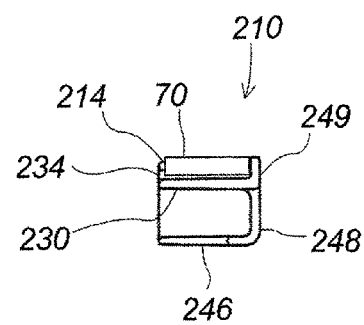
FIG. 13 is a top plan view of the mounting bracket of FIG. 8.
Figure 14:
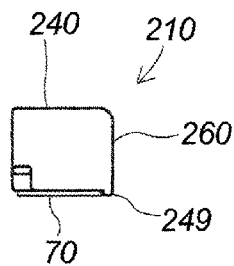
FIG. 14 is a bottom plan view of the mounting bracket of FIG. 8.

Referring specifically to FIGS. 9 and 10, in an exemplary embodiment, second mount 210 includes a second cord retainer clip 224 that extends from back face 212. Second cord retainer clip 224 extends generally the width of back face 212 and includes a second opening 226 that is sized to allow a power cord (not shown) for providing AC power to electronic device 50 to be received within opening 226 and retained by second cord retainer clip 224. Second cord retainer clip 224 may be a different size than first cord retainer clip 120 so that either first cord retainer clip 120 or second cord retainer clip to 20 can accommodate power cords of different diameters or, alternatively, depending upon a user's preference, whether the user desires to power cord to be retained with a tighter fit or a looser fit. Alternatively, second cord retainer clip 224 can be identical to first cord retainer clip 120 such that the whole of second mount 210 is a mirror image of first mount 110 across plane 62.

Both first cord retainer clip 120 and second cord retainer clip 224 are recessed such that they are hidden from view when viewing mounting assembly 100 from the front, as shown in FIGS. 15 and 15B.

Referring back to FIG. 3, back face 112 further comprises a stub portion 130 extending from forward surface 116, such that stub portion 130 and an upper portion 132 of back face 112 the fine define a vertical slot 134. Vertical slot 134 is sized to allow a pull tab 72 on removable adhesive strip 70 to be inserted into vertical slot 134 so the pull tab 72 is not visible when viewing mount assembly 100 and electronic device 50, shown in FIGS. 15 and 15B.

Figure 4:
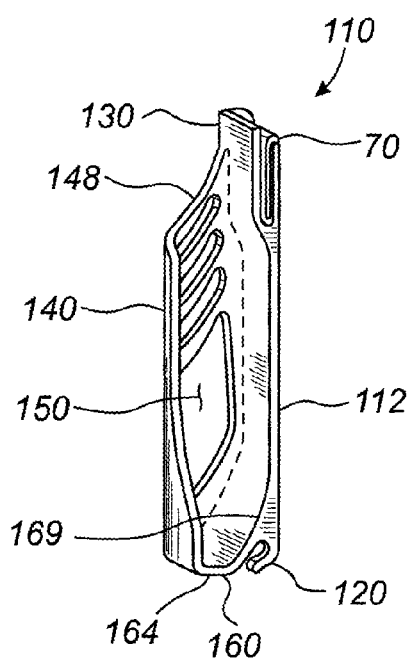
FIG. 4 is a perspective view of the mounting bracket of FIG. 1.
Figure 5:
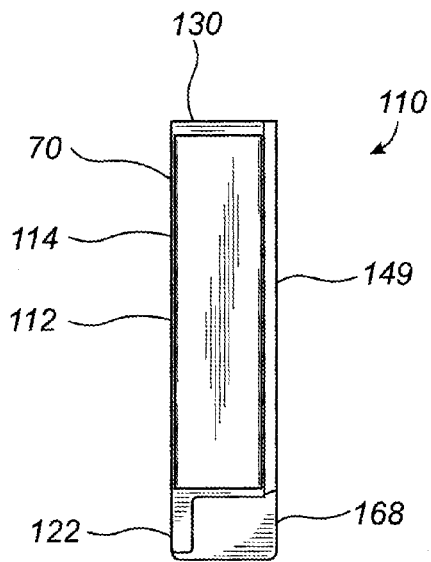
FIG. 5 is a rear elevation view of the mounting bracket FIG. 1.
Figure 6:
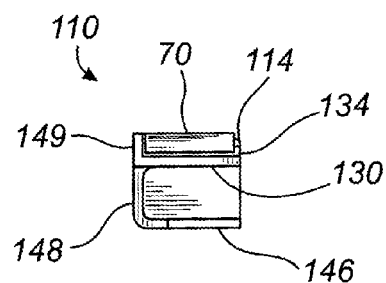
FIG. 6 is a top plan view of the mounting bracket of FIG. 1.
Figure 7:
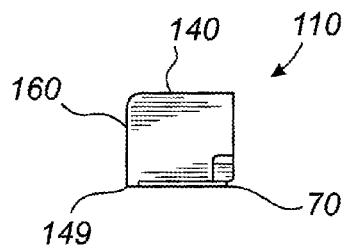
FIG. 7 is a bottom plan view of the mounting bracket of FIG. 1.
Figure 8:
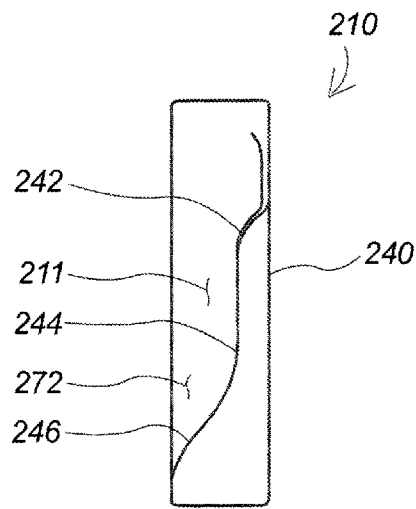
FIG. 8 is a front elevation view of a right mounting bracket according to the first exemplary embodiment of the present invention.

As shown in FIGS. 3 and 4, stub portion 130 extends outward from back face 112 such that stub portion 130 is adapted to engage a rear portion of electronic device 50 when electronic device 50 is inserted into first mount 110. Stub portion 130 also spaces electronic device 50 away from wall 60, as shown by arrow "A" in FIG. 15A, which makes it easier for user to grab electronic device 50 the top of electronic device 50 with just one hand, allowing fingers to fit into the space defined by arrow A, allowing the user to grip electronic device 50. Additionally, the space allows electronic device 50 to be docked with certain protective cover still at least partially attached, specifically, for example, an iPad 2 smart cover 58, which can be wrapped behind the iPad and then folded in half, allowing cover 58 to fit into the space defined by arrow A between electronic device 50 and wall 60.

Referring back to FIGS. 1-4, first mount 110 further includes a generally planar front face 140 extending generally parallel to back face 112. Front face 140 retains electronic device 50 and prevents electronic device 50 from falling forward from mount assembly 100. Front face 140 is spaced from back face 112 a sufficient distance to allow electronic devices of different size and thickness is to be inserted into first mount 110, but is close enough to back face 112 to prevent electronic device 50 from "flopping around" when it is mounted in first mount 110.

As shown FIG. 1, front face 140 has a gently curved upper portion 142 connected to a generally thin, straight and vertical middle portion 144, which, in turn, is connected to a gently curved lower portion 146. The shape and contours of front face 140 allow front face 142 to secure electronic device 50 while minimizing the amount of screen on electronic device 50 that is obscured by front face 140.

Referring to FIGS. 2-4, a side face 148 extends between back face 112 and front face 140. Side face 148 includes an extension ridge 149 that extends beyond back face 112, thereby hiding removable adhesive strip 70 from view when looking at mounting bracket 110 from the left side and also makes mounting bracket 110 flush with wall 60, as shown in FIG. 15A.

Side face 148 has at least one opening 150 extending therethrough. Opening 150 is sized to allow an electronic cable connection such as, for example, a power cord (not shown) to extend therethrough to connect to electronic device 50 when electronic device is mounted in mounting assembly 100.

In addition to opening 150, additional openings 152-156 may be formed inside face 148. Openings 152-156 may be provided for ventilation purposes, for aesthetics, and/or to reduce the amount of material used to manufacture mount 110.

Referring to FIG. 3, a bottom face 160 extends between back face 112 and front face 140. Bottom face 160 engages and supports electronic device 50 when electronic device 50 is inserted into mount 110. Bottom face 160 includes an upper surface 162 and an under surface 164. Bottom face further includes a first portion 166 extending from and generally perpendicular to front face 140 and a second portion 168 extending from and generally oblique to back face 112. Second portion 168 has a gently curved device engaging surface 169 and engages electronic device 50 when electronic device 50 is inserted into 110.

Back face 112, front face 140, side face 148, and bottom face 160 form receiver 111 having an opening 172 disposed away from side face 148 such that electronic device 50 can be inserted into receiver 111 at opening 172.

As discussed above, second mount 210, which is separate from first mount 110, and is shown in FIGS. 8-14, is generally a mirror image across plane 62, with the exception of cord retainer clip 224, which is a slightly different size than cord retainer clip 120.

Because first mount 110 and second mount 210 are separate and distinct from each other, first mount 110 second mount 210 can be spaced apart from each other by varying distances to accommodate whatever size electronic device 50 is intended to be supported by mount assembly 100.

To use mount assembly 100, a first removable adhesive strip 70 is affixed to wall mount surface 114 of first mount 110 such that pull tab 72 on removable adhesive strip 70 is extending upward, away from bottom face 160. Pull tab 72 is inserted into vertical slot 134. Electronic device 50 is inserted into first mount 110 by sliding first lower corner 52 of electronic device 50 into receiver 111 at opening 172.

The process is repeated for a second removable adhesive strip 70 with respect to second mount 210, with second lower corner 54 of electronic device 50 being slid into receiver 211 at opening 272. Backing strips (not shown) on each of the removable adhesive strips 70 are removed, exposing adhesive on the wall side of each removable adhesive strip 70. A desired location is selected on wall 60 for mounting electronic device 50 and first mount 110 and second mount 210 are pressed against wall 60 so that removable adhesive strips 70 secure their respective first mount 110 and second mount 210 to wall 60, thereby mounting electronic device 50 onto wall 60. When first mount 110 and second mount 210 are mounted on wall 60, the opening 172 in first mount receiver 111 is proximate opening 272 in second mount receiver 211.

In order to remove mount assembly 100 from wall 60, electronic device 50 is removed from mount assembly 100. Pull tab 72 in first mount 110 is removed from vertical slot 134 by inserting a thin object, such as, for example, an end of a paperclip (not shown), into vertical slot 134 between upper portion 132 of back face 112 and pull tab 72 and then gently pulling the end of the paperclip upward, sliding pull tab 72 out of vertical slot 134. Once pull tab 72 has been removed from vertical slot 134, pull tab 72 can be pulled upward, stretching removable adhesive strip 70 to a point where removable adhesive strip 70 releases first mount 110 from wall 60. The process is repeated for second mount 210.

Figure 24:
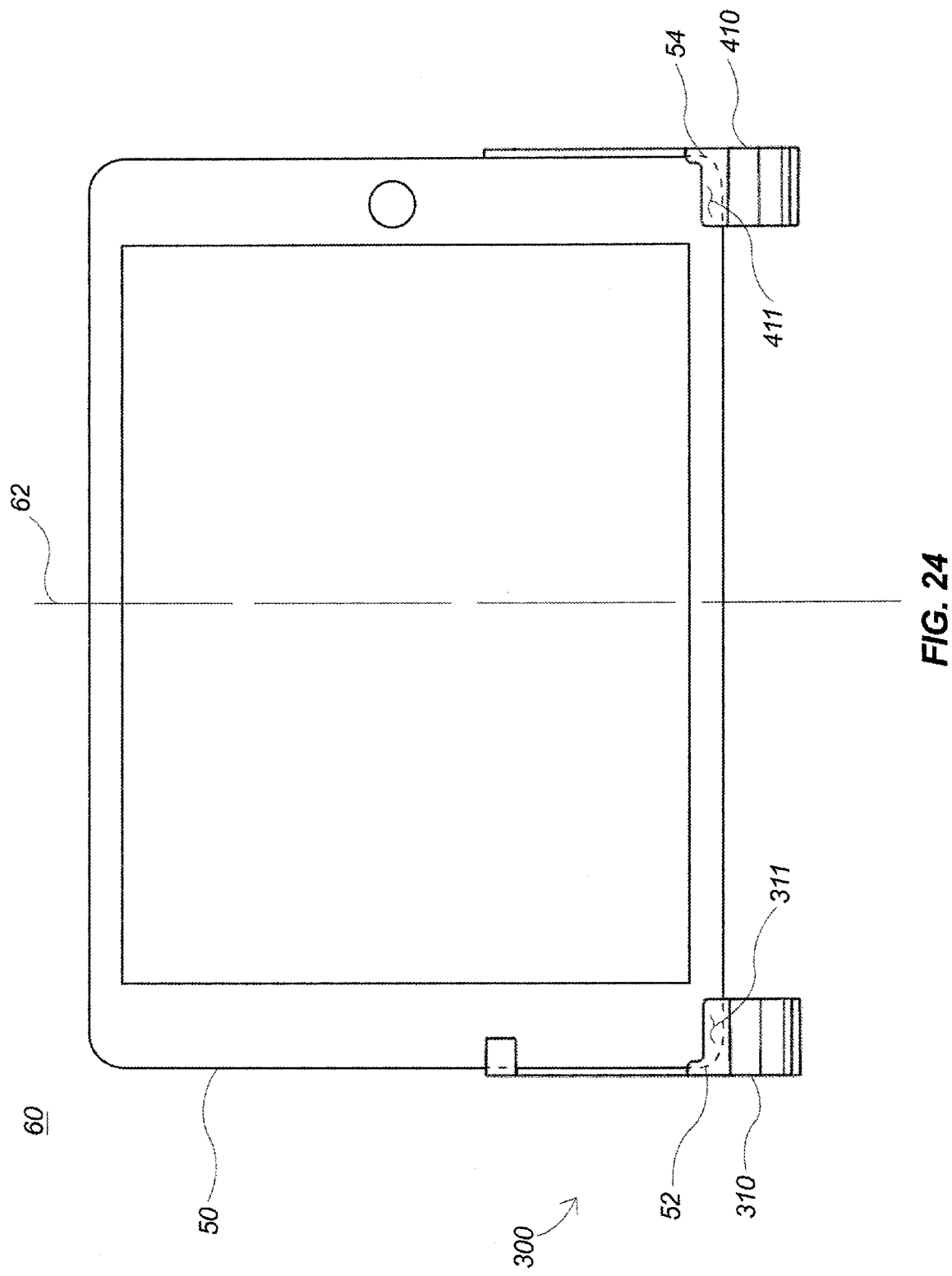
FIG. 24 is a front elevation view of the left mounting bracket of FIGS. 16-19 and the right mounting bracket of FIGS. 20-23 supporting a personal electronic device on the wall.

A second embodiment of a mounting assembly 300 according to the present invention is shown in FIGS. 16-24. Referring specifically to FIG. 24, mount assembly 300 includes a first mount 310 that is used to support first lower corner 52 of electronic device 50 within a receiver 311 and a second mount 410 that is used to support second lower corner 54 of electronic device 50 within a receiver 411 when mount assembly 300 is mounted on a wall 60.

In many aspects, first mount 310 and second mount 410 are mirror images of each other across plane 62 perpendicular to wall 60 when mount assembly 100 is mounted on wall 60. For ease of description therefore, elements of first mount 310 that are mirror images of elements of second mount 410 will be identified with a three digit number beginning with "3", while the elements a second mount 410 will be identified with a three digit number beginning with "4", with the last two digits of each corresponding element being identical. For example, element 312 in first mount 310 is a mirror image of element 312 in second mount 310.

Referring to FIGS. 16-19, first mount 310 includes a generally planar, elongate back face 312 having a rear, wall mount surface 314 and a forward surface 316. Back face 312 is sized to allow a removable adhesive strip 70 such as, for example, a 3M Command® strip, to be removably attached to wall mount surface 314 such that removable adhesive strip 70 is not visible when mount assembly 300 is mounted on wall 60 and electronic device 50 is mounted in mount assembly 300.

A cord retainer clip 320 extends from back face 312. Cord retainer clip 320 is shaped generally like an arcuate finger that extends generally the width of back face 312 and includes an opening 322 that is sized to allow a power cord (not shown) for providing AC power to electronic device 50 to be received within opening 322 and retained by cord retainer clip 320. Cord retainer clip 320 has a wider opening toward the front of first mount 310 and a narrower opening toward the rear of first mount 310 is the so that when the power cord is inserted into cord retainer clip 320 and pushed toward the rear of first mount 310, the court can be slightly pinched, which resulted in the cord being held by cord retainer clip 320 and not falling to the floor.

Cord retaining clip 320 further comprises a cavity 330 formed beneath opening 322. Cavity 330 includes an opening 332 facing toward the rear of first mount 310. Cavity 330 is sized to allow pull tab 72 on removable adhesive strip 70 to be inserted into the cavity 330 at opening 332 so that pull tab 72 is not visible when viewing mount assembly 300 and electronic device 50, shown in FIG. 24.

Referring back to FIGS. 16-19, first mount 310 further includes a generally planar front face 340 extending generally parallel to back face 312. Front face 340 retains electronic device 50 and prevents electronic device 50 from falling forward from mount assembly 300. Front face 340 is spaced from back face 312 a sufficient distance to allow electronic devices of different size and thickness is to be inserted into first mount 310, but is close enough to back face 312 to prevent electronic device 50 from "flopping around" when it is mounted in first mount 310.

A side face 348 extends between back face 312 and front face 340. Side face 348 covers the side of cavity 330 so that pull tab 72 is generally not visible from the side of first mount 310.

A bottom face 360 extends between back face 312 and front face 340. Bottom face 360 engages in supports electronic device 50 when electronic device 50 is inserted into mount 310.

Back face 312, front face 340, side face 348, and bottom face 360 form receiver 311 having an opening 372 disposed away from side face 348 such that electronic device 50 can be inserted into receiver 311 at opening 372.

As discussed above, second mount 410, which is separate from first mount 310, and is shown in FIGS. 20-23, is generally a mirror image of first mount 310 across plane 62, with the following exception. First mount 310 includes an extension arm 380 that extends outward from a top portion of back face 312. An end of extension arm 380 distal from backspace 312 includes a retaining arm 382 that extends generally parallel to and coplanar with front face 340. Extension arm 380 is sufficiently long so that electronic device 50 can be retained between retaining arm 382 and back face 312. Optionally, although not shown, second mount 410 can also include an extension arm and a retaining arm that are mirror images of extension arm 380 and retaining arm 382.

Because first mount 310 and second mount 410 are separate and distinct from each other, first mount 310 second mount 410 can be spaced apart from each other by varying distances to accommodate whatever size electronic device 50 is intended to be supported by mount assembly 300.

To use mount assembly 300, a first removable adhesive strip 70 is affixed to wall mount surface 314 of first mount 310 such that pull tab 72 on removable adhesive strip 70 is extending downward, away from bottom face 360. Pull tab 72 is inserted into the cavity 330. Electronic device 50 is inserted into first mount 310 by sliding first lower corner 52 of electronic device 50 into receiver 311 at opening 372.

The process is repeated for a second removable adhesive strip 70 with respect to second mount 410, with second lower corner 54 of electronic device 50 being slid into receiver 411 at opening 472. Backing strips (not shown) on each of the removable adhesive strips 70 are removed, exposing adhesive on the wall side of each removable adhesive strip 70. A location is selected on wall 60 and first mount 310 and second mount 410 are pressed against wall 60 so that removable adhesive strips 70 secure their respective first mount 310 and second mount 410 to wall 60, thereby mounting electronic device 50 onto wall 60.

In order to remove mount assembly 300 from wall 60, electronic device 50 is removed from mount assembly 300. Pull tab 72 in first mount 310 is removed from cavity 330 by inserting a thin object, such as, for example, an end of a paperclip (not shown), into cavity 330 between cord retaining clip 320 and pull tab 72 and then gently pulling the end of the paperclip downward, sliding pull tab 72 out of cavity 330. Once pull tab 72 has been removed from cavity 330, pull tab 72 can be pulled downward, stretching removable adhesive strip 70 to a point where removable adhesive strip 70 releases first mount 310 from wall 60. The process is repeated for second mount 410.

The inventive mount assemblies described above may be manufactured from ABS plastic or other suitable material, such as by using known injection molding procedures.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A mount assembly for a personal electronic device comprising:
   a first mount and a second mount, each of the first and second mounts having:
   a generally planar back face having:
      a rear, wall mount surface; and
      a forward surface;
   a generally planar front face extending generally parallel to the back face;
   a side face extending between the back face and the front face; and
   a bottom face extending between the back face and the front face, the bottom face having:
      an upper surface;
      and
      an under surface;
   wherein the back face further comprises a stub portion extending from the forward surface, the stub portion and a portion of each back face defining a vertical slot formed between the stub portion and the back face;
   and
   wherein the back face, the front face, the side face, and the bottom face of each of the first and second mounts form a receiver having an opening disposed away from each side face, such that, when the first mount and the second mount are mounted on a wall, the opening in the first mount receiver is proximate the opening in the second mount receiver.

2. The mount assembly according to claim 1, wherein the first mount further comprises a first cord retainer clip extending from the back face.

3. The mount assembly according to claim 2, wherein the second mount further comprises a second cord retainer clip extending from the back face, wherein the second cord retainer clip is a different size than the first cord retainer clip.

4. The mount assembly according to claim 2, wherein the first cord retainer clip further comprises a receiver adapted to receive a pull tab on an adhesive strip.

5. The mount assembly according to claim 1, wherein the first mount further comprises a retaining arm extending outward from the forward surface of the back face.

6. The mount assembly according to claim 1, wherein each stub portion is adapted to engage a rear portion of a personal electronic device.

7. The mount assembly according to claim 1, wherein each bottom face comprises:
   a first portion extending from and generally perpendicular to each front face; and
   a second portion extending from and generally oblique to each back face.

8. The mount assembly according to claim 7, wherein each second portion has a generally curved device engaging surface.

9. The mount assembly according to claim 1, wherein each side face has at least one opening extending therethrough, each opening being sized to allow an electronic cable connection to extend therethrough.

10. The mount assembly according to claim 1, further comprising an adhesive strip removably attached to the rear, wall mount surface of each back face.

11. A mount assembly for a personal electronic device comprising:
   a first mount and a second mount, each of the first and second mounts having:
   a generally planar back face having:
      a rear, wall mount surface; and
      a forward surface;
   a generally planar front face extending generally parallel to the back face;
   a side face extending between the back face and the front face; and
   a bottom face extending between the back face and the front face, the bottom face having:
   an upper surface; and
   an under surface;
   wherein the back face, the front face, the side face, and the bottom face of each of the first and second mounts form a receiver having an opening disposed away from each side face, such that, when the first mount and the second mount are mounted on a wall, the opening in the first mount receiver is proximate the opening in the second mount receiver; and
   wherein each side face comprises a ridge extending vertically above and beyond the respective back face.

12. A mount assembly for a portable electronic device comprising:
   a first mount and a second mount, separate from the first mount, each of the first mount and the second mount comprising:
   a rear portion having an adhesive retaining surface;
   a forward portion;
   a bottom portion connecting the rear portion to the forward portion;
   a side portion connecting the rear portion, the bottom portion, and the forward portion to each other, the side portion extending in a plane;
   a releasable adhesive pull tab securing slot extending forward from the rear portion;
   wherein the first mount further comprises a first cord clip extending downwardly from the rear portion, the first cord clip having a first size; and wherein the second mount further comprises a second cord clip extending downwardly from the rear portion.

13. The mount assembly according to claim 12, wherein each cord clip comprises an arcuate finger.

14. The mount assembly according to claim 12, further comprising a releasable adhesive releasably mounted to each rear portion.

15. The mount assembly according to claim 12, wherein each of the first mount and the second mount further comprises a slot adapted to retain a releasable adhesive pull tab.

16. The mount assembly according to claim 15, wherein each slot is formed in each rear portion.

17. The mount assembly according claim 15, wherein each slot extends outward generally horizontally from each rear portion.

18. The mount assembly according to claim 12, wherein each side portion comprises a ridge extending beyond the respective rear portion.

19. The mount assembly according to claim 12, further comprising an arm extending outwardly from the rear portion of the first mount.

* * * * *